United States Patent
Zahir et al.

(10) Patent No.: US 9,821,295 B2
(45) Date of Patent: *Nov. 21, 2017

(54) PROCESS FOR MAKING A NIO-DOPED ALUMINOGALLATE NANOCOMPOSITE

(71) Applicant: KING FAHD UNIVERSITY OF PETROLEUM AND MINERALS, Dhahran (SA)

(72) Inventors: Md Hasan Zahir, Dhahran (SA); Alhooshani Khalid, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/634,297

(22) Filed: Jun. 27, 2017

(65) Prior Publication Data

US 2017/0291165 A1    Oct. 12, 2017

Related U.S. Application Data

(63) Continuation of application No. 15/048,535, filed on Feb. 19, 2016, now Pat. No. 9,737,879.

(51) Int. Cl.
*B01J 21/04* (2006.01)
*B01J 23/08* (2006.01)
(Continued)

(52) U.S. Cl.
CPC ........ *B01J 23/755* (2013.01); *B01D 53/8628* (2013.01); *B01J 23/005* (2013.01);
(Continued)

(58) Field of Classification Search
CPC ... B01J 21/04; B01J 23/08; B01J 23/62; B01J 23/825; B01J 23/896; B01J 37/0072;
(Continued)

(56) References Cited

U.S. PATENT DOCUMENTS 4,935,934 A    6/1990  Ferrand
6,632,758 B2  10/2003  Beall
(Continued)

FOREIGN PATENT DOCUMENTS

JP    03245608 B2    1/2002

OTHER PUBLICATIONS

L.Chen et. al,"Catalytic reduction of NO by hydrocarbons over a mechanical mixture of spinel Ni—Ga oxide and manganese oxide" http://www.researchgate.net/publication/227048278_Catalytic_reduction_of_NO_by_hydrocarbons_over_a_mechanical_mixture_of_spinel_NlGa_oxide_and_manganese_oxide, Aug. 1999, pp. 1-1.

(Continued)

*Primary Examiner* — Cam N. Nguyen
(74) *Attorney, Agent, or Firm* — Oblon, McClelland, Maier & Neustadt, L.L.P.

(57) ABSTRACT

The present disclosure relates to a process for producing a finely divided metal-doped aluminogallate nanocomposite comprising mixing a carrier solvent with a bulk metal-doped aluminogallate nanocomposite to form a bulk metal-doped aluminogallate slurry and atomizing the bulk metal-doped aluminogallate slurry using a low temperature collision to produce a finely divided metal-doped aluminogallate nanocomposite, the composition of a nickel-doped aluminogallate nanocomposite (GAN), and a method of NO decomposition using the nickel-doped aluminogallate nanocomposite.

12 Claims, 6 Drawing Sheets

(51) Int. Cl.

| | | |
|---|---|---|
| *B01J 23/62* | (2006.01) | |
| *B01J 23/825* | (2006.01) | |
| *B01J 23/89* | (2006.01) | |
| *B01J 37/00* | (2006.01) | |
| *B01J 37/03* | (2006.01) | |
| *B01J 37/04* | (2006.01) | |
| *B01J 37/10* | (2006.01) | |
| *B01J 35/00* | (2006.01) | |
| *B01J 35/10* | (2006.01) | |
| *B01J 23/755* | (2006.01) | |
| *B01J 23/00* | (2006.01) | |
| *B01J 37/08* | (2006.01) | |
| *B01J 37/02* | (2006.01) | |
| *B01D 53/86* | (2006.01) | |

(52) U.S. Cl.
CPC .......... *B01J 23/08* (2013.01); *B01J 35/0006* (2013.01); *B01J 35/0013* (2013.01); *B01J 35/1019* (2013.01); *B01J 37/0221* (2013.01); *B01J 37/031* (2013.01); *B01J 37/036* (2013.01); *B01J 37/04* (2013.01); *B01J 37/088* (2013.01); *B01J 37/10* (2013.01); *B01D 2255/2092* (2013.01); *B01D 2255/20753* (2013.01)

(58) Field of Classification Search
CPC ........ B01J 37/031; B01J 37/038; B01J 37/04; B01J 37/10; B01J 35/006; B01J 35/0013; B01J 35/1019
See application file for complete search history.

(56) References Cited

U.S. PATENT DOCUMENTS

| | | |
|---|---|---|
| 6,703,343 B2 | 3/2004 | Park |
| 6,706,660 B2 | 3/2004 | Park |
| 2013/0034482 A1 | 2/2013 | Zones et al. |

OTHER PUBLICATIONS

T. Nakantani et. al "Characterization of gamma-Ga2O3—Al2O3 prepared by solvothermal method and its performance for methane-SCR of NO." http://www.ncbi.nlm.nih.gov/pubmed/19480421, Jun. 2009, pp. 1-1.

PROCESS FOR MAKING A NIO-DOPED ALUMINOGALLATE NANOCOMPOSITE

CROSS-REFERENCE TO RELATED APPLICATIONS

The present application is a continuation of Ser. No. 15/048,535, having a filing date of Feb. 19, 2016, now allowed.

STATEMENT OF ACKNOWLEDGEMENT

This project was funded by King Fahd University of Petroleum & Minerals and King Abdul-Aziz City of Science and Technology under project number AT-32-21.

BACKGROUND OF THE INVENTION

Technical Field

The present disclosure relates to a process for producing a finely divided metal-doped aluminogallate nanocomposite and a method of NO decomposition using the nanocomposite.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

One of the limitations to the direct decomposition of nitrogen oxides is the lack of robust catalysts capable of performing under real world conditions. Nitrogen oxides ($NO_x=NO+NO_2$) are a well-known class of toxic byproducts from the combustion of hydrocarbon fuels [see, Nirisen et al., US2004/0023796A1, incorporated herein by reference in its entirety]. An increasing number of environmental and health issues including elevated ozone production, acid rain fall, soil contamination and cyanosis in humans are linked to increased $NO_x$ production.

A potential solution for combating $NO_x$ production is the catalytically driven direct decomposition reaction which converts $NO_x$ into $N_2$ and $O_2$. The reaction which can take place with or without a reducing agent requires a catalyst to be stable under "real world" conditions including the presence of sulfates ($SO_2$), $H_2O$ vapor, prolonged catalytic use and reaction temperatures in excess of 300° C. However, decomposition without the presence of a reducing agent proceeds considerably slower than reactions with the reducing agent [See Luo, Y. M., 2004, "Influence of preparation methods on selective catalytic reduction of nitric oxides by propene over silver-alumina catalyst," *Catalysis Today* incorporated herein by reference in its entirety]. This makes reaction mechanisms with a reducing agent (such as a hydrocarbon) the preferred decomposition route for $NO_x$. These conditions are consistent with applications such as those required within an automotive catalytic converter.

Some existing methods for making catalytic materials with NO decomposition potential include sol-gel, co-precipitation and hydrothermal processes [See Pitukmanorom, P., 2009, "Selective catalytic reduction of nitric oxide by propene over $In_2O_3/Al_2O_3$ nanocomposites," *Nano Today* incorporated herein by reference in its entirety]. Single metal oxides, multiple metal composite oxides, zeolites doped with transition metals, and three-way catalysts (TWCs) made from the above processes have been investigated [See Matsumoto, S., 2004, "Recent Advances in automobile exhaust catalysts," *Catalysis Today* incorporated herein by reference in its entirety]. For example, λ phase $Al_2O_3$, and $γ-Ga_2O_3$—$Al_2O_3$ made from co-precipitation and hydrothermal processes respectively in the presence of a reducing agent have effectively catalyzed $NO_x$ decomposition, while transition metal-doped $γ$—$Al_2O_3$ show improved stability in the presence of $H_2O$ vapor and $SO_2$ [See Pitukmanorom, P., 2009, "Selective catalytic reduction of nitric oxide by propene over $In_2O_3/Al_2O_3$ nanocomposites," *Nano Today* incorporated herein by reference in its entirety].

Unfortunately, the catalytic activities of these materials were either extinguished in the presence of $H_2O$ vapor, $SO_2$, or require reaction conditions that are not consistent with any real world applications [See Sloczynski, J., 1999, "Oxidative Dehydrogenation of propane on $Ni_xMg_{1-x}Al_2O_4$ and $NiCr_2O_4$ Spinels" *Journal of Catalysis* incorporated herein by reference in its entirety]. Additionally, $γ-Ga_2O_3$—$Al_2O_3$ and transition metal-doped $γ-Al_2O_3$ undergo heat induced phase transitions at elevated reaction temperatures which limit catalytic activity. Meanwhile, calcinating and/or milling steps (which are commonly used in co-precipitation and sol-gel processes to make solid solution products) promote unrestricted grain growth giving rise to $γ-Ga_2O_3$—$Al_2O_3$ and transition metal-doped $γ-Al_2O_3$ materials with variable nanoparticle diameters [See Aguilar-Rios, G., 1995, "Hydrogen interactions and catalytic properties of platinum-tinsupported on zinc aluminate," *Applied Catalysis A* incorporated herein by reference in its entirety]. These variably sized nanoparticles provide low yielding reaction surface areas which limit $NO_x$ decomposition efficiencies.

In view of the foregoing, one object of the present disclosure is to present a process for making a robust $NO_x$ decomposition catalyst and a method of using said catalyst.

BRIEF SUMMARY OF THE INVENTION

According to a first aspect the present disclosure relates to a process for producing a finely divided metal-doped aluminogallate nanocomposite comprising i) mixing a carrier solvent with a bulk metal-doped aluminogallate nanocomposite synthesized by a process selected from co-precipitation, sol-gel, hydrothermal and/or any combination thereof to form a bulk metal-doped aluminogallate slurry, wherein the bulk metal-doped aluminogallate nanocomposite comprises $Ga_2O_3$, $Al_2O_3$, and at least one metal oxide dopant comprising a metal selected from the group consisting of Cr, Mn, Fe, Co, Ni, Cu, Zn, Ag, Au, Pd, Pt, Ru, Rh, In, Ir, Tl, Ge, and Sn and ii) atomizing the bulk metal-doped aluminogallate slurry using a low temperature collision to produce the finely divided metal-doped aluminogallate nanocomposite.

In one embodiment, the bulk metal-doped aluminogallate is synthesized by a hydrothermal process comprising i) adding a precipitating agent to an aqueous solution comprising a gallium salt, an aluminum salt, and a metal dopant salt to form a metal-doped aluminogallate suspension with a pH of 8-12 and ii) heating the metal-doped aluminogallate suspension to a hydrothermal reaction temperature in a range of 100° C.-350° C., for a reaction time range of 24-100 hrs to form the bulk metal-doped aluminogallate nanocomposite.

In one embodiment, the atomizing comprises i) injecting the bulk metal-doped aluminogallate slurry into a fluid carrier stream to produce a bulk metal-doped aluminogallate slurry stream ii) colliding the bulk metal-doped aluminogallate slurry stream with a surface of at least one collision agent within an atomizing unit reaction zone at a flow rate, and a sufficient pressure to atomize the bulk metal-doped aluminogallate slurry stream and form the finely divided metal-doped aluminogallate nanocomposite without any heat induced phase transitions.

In one embodiment, the bulk metal-doped aluminogallate slurry comprises 20-45 mol % $Ga_2O_3$, 35-60 mol % $Al_2O_3$, and 2-30 mol % metal oxide dopant relative to the total molar composition of the bulk metal-doped aluminogallate nanocomposite.

In one embodiment, the metal oxide dopant is nickel oxide.

In one embodiment, the atomizing unit is a wet jet atomizer.

In one embodiment, the sufficient pressure is 50 MPa-400 MPa.

In one embodiment, prior to the colliding the bulk metal-doped aluminogallate slurry stream passes through a nozzle having a nozzle diameter of 50 μm-300 μm.

In one embodiment, the flow rate of the bulk metal-doped aluminogallate slurry is 2 L/hr to 840 L/hr.

In one embodiment, the at least one collision agent is at least a portion of the bulk metal-doped aluminogallate slurry.

In one embodiment, the at least one collision agent is a ceramic ball.

In one embodiment, the bulk metal-doped aluminogallate slurry, the finely divided metal-doped aluminogallate nanocomposite or both are not calcined or milled.

According to a second aspect, the present disclosure relates to a finely divided nickel-doped aluminogallate nanocomposite, comprising $Ga_2O_3$, $Al_2O_3$, and NiO, wherein the nanocomposite is in the form of a nanoparticle with a diameter of 100-200 nm, a surface area range of 250-300 $m^2/g$, and an uncontaminated spinel structure.

In one embodiment, the finely divided metal-doped aluminogallate nanocomposite comprises NiO on an outer surface of the nanoparticle.

In one embodiment, the finely divided metal-doped aluminogallate nanocomposite comprises 25-35 mol % $Ga_2O_3$, 40-50 mol % $Al_2O_3$, and 5-30 mol % NiO, relative to the total molar composition of the finely divided metal-doped aluminogallate nanocomposite.

According to a third aspect the present disclosure relates to a method of direct nitric oxide decomposition comprising i) contacting an initial gas mixture comprising nitric oxide with the finely divided metal-doped aluminogallate nanocomposite to decompose nitric oxide (NO) into nitrogen ($N_2$).

In one embodiment, the initial gas mixture further comprises a reducing agent selected from the group consisting of ethylene ($C_2H_4$), propylene ($C_3H_6$), butene ($C_4H_8$), ammonia ($NH_4$) and/or any combination thereof.

In one embodiment, a maximum conversion of NO—$N_2$ occurs at a temperature of 300-700° C.

In one embodiment, the maximum conversion of NO—$N_2$ is reduced by no more than 25%, in terms of the total weight of NO decomposed into $N_2$, when the gas mixture further comprises up to 10 wt % $H_2O$ vapor, up to 3 ppm of $SO_2$ gas, and/or both relative to the total weight of the gas mixture.

In one embodiment, the maximum conversion of NO—$N_2$ conversion is reduced by no more than 25% by weight within a temperature range of 300-700° C. for a reaction time up to 50 hrs.

DETAILED DESCRIPTION OF THE EMBODIMENTS

Figure 1:
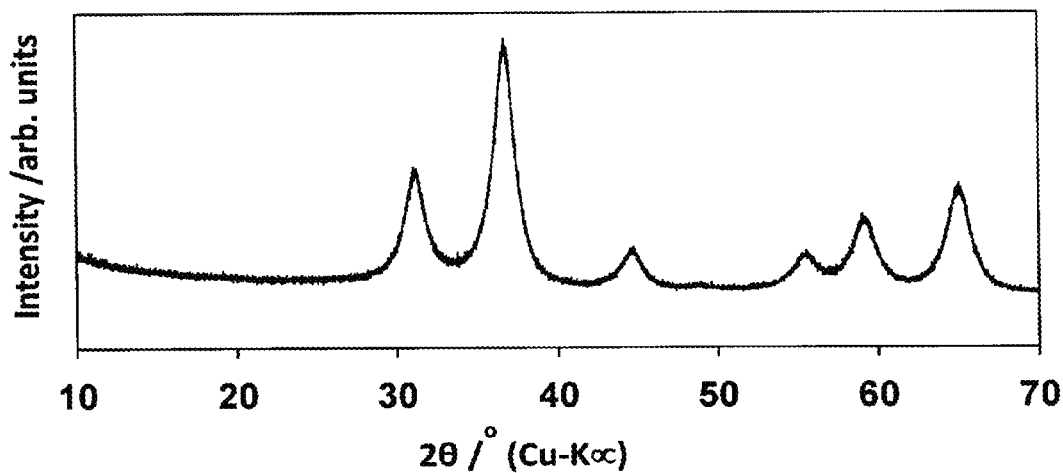
FIG. 1 is an X-ray diffraction pattern of a spinel structured $Ga_2O_3$—$Al_2O_3$—NiO (GAN) powder sample prepared with the hydrothermal method.
Figure 2:
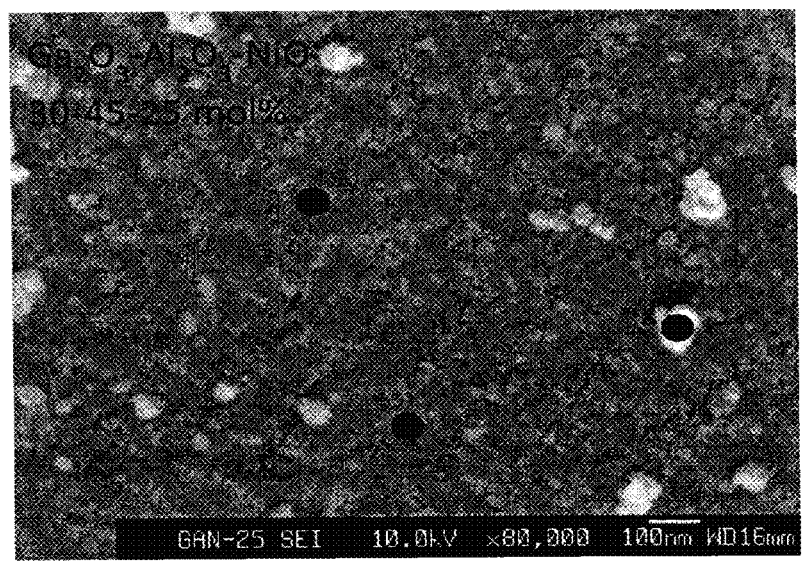
FIG. 2 is a SEM image of a spinel structured GAN powder prepared with the co-precipitation method.
Figure 3:
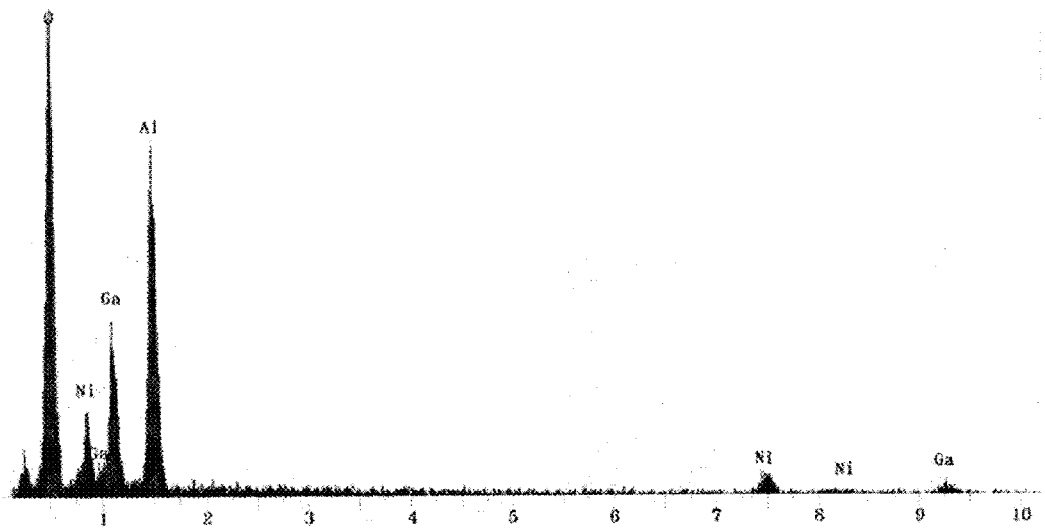
FIG. 3 is an EDS of a spinel structured GAN powder prepared with the co-precipitation method.
Figure 4A:
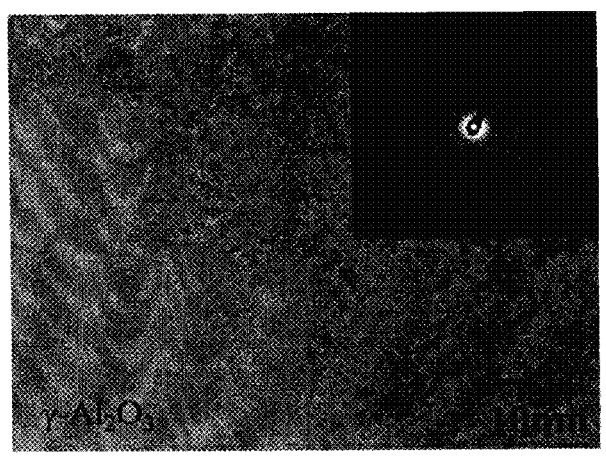
FIG. 4A is a TEM image of a γ-$Al_2O_3$ prepared with the sol-gel method.
Figure 4B:
FIG. 4B is a TEM image of a $Ga_2O_3$—$Al_2O_3$ prepared with the sol-gel method.
Figure 4C:
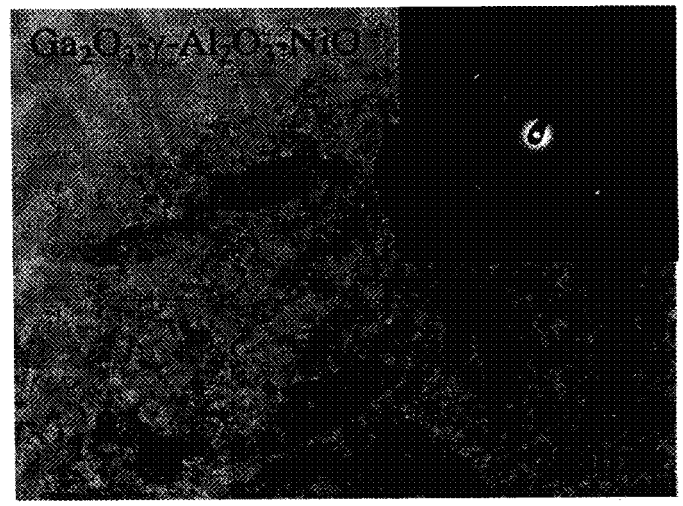
FIG. 4C is a TEM image of $Ga_2O_3$—$Al_2O_3$—NiO prepared with the sol-gel method.
Figure 5A:
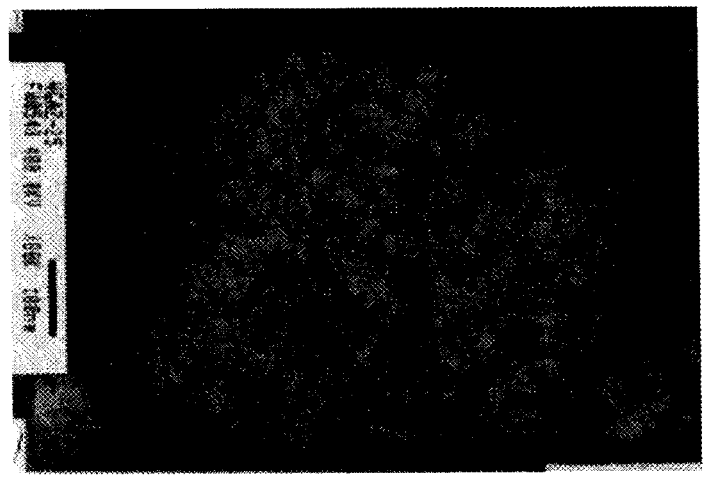
FIG. 5A is a TEM image of a spinel structured GAN powder prepared with the hydrothermal method.
Figure 5B:
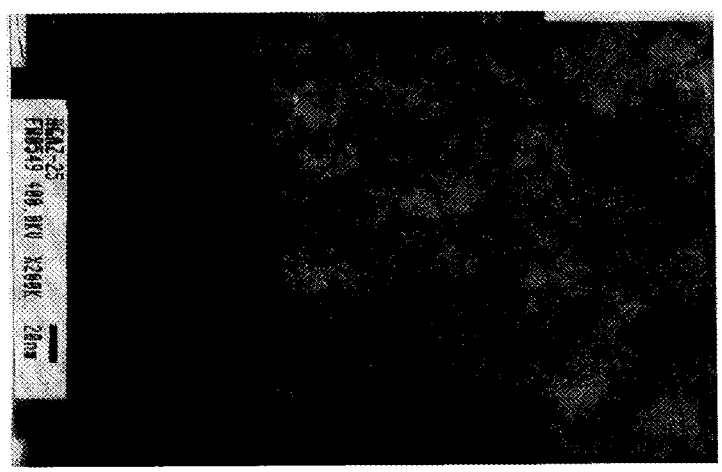
FIG. 5B is a TEM image of a spinel structured GAN powder prepared with the hydrothermal method after wet-atomization.

According to a first aspect, the present disclosure relates to a process for producing a finely divided metal-doped aluminogallate nanocomposite comprising mixing a carrier solvent with a bulk metal-doped aluminogallate nanocomposite to form bulk metal-doped aluminogallate slurry.

The bulk metal-doped aluminogallate may be produced by a process selected from but not limited to a hydrothermal process, a co-precipitation process, a sol-gel process and/or any combination thereof, which are all well known by those skilled in the art. Examples of each process are detailed in examples 1-3.

In a preferred embodiment, the bulk metal-doped aluminogallate is produced by a hydrothermal process which includes, adding a precipitating agent to an aqueous solution comprising a gallium salt, an aluminum salt, and a metal dopant salt to form a metal-doped aluminogallate suspension with a pH of 8-9, preferably 8.3-8.6.

Adding as used herein may refer to any process of combining two or more components/solution/mixtures to form a combined mixture and is well known by those skilled in the art. An exemplary adding procedure may include pouring, dropping, injecting and/or any combination thereof.

A precipitating agent may refer to any chemical species that induces a reaction wherein at least one reactant in solution undergoes a phase transition to form a solid species. Typically, adding a precipitating agent results in the production of acidic or basic ionic species, resulting in a mixture with a higher or lower pH value relative to the starting mixture pH. This effect is well known by those skilled in the art. In one embodiment, the aqueous solution after the adding has a pH ranging from 8.3-8.6.

Exemplary precipitating agents may include but are not limited to acids such as hydrochloric acid, sulfuric acid, and anthranilic acid; metal carbonates such as lithium carbonate, sodium carbonate, and potassium carbonate; metal sulfates; metal phosphates; metal nitrates such as silver nitrate; organic carbonates such as ammonium carbonate; and chelating agents such as 8-hydroxyquinolone, dimethylglyoxime, and ammonium oxalate. In one embodiment, the precipitating agent is ammonium carbonate.

Gallium(III) oxide ($Ga_2O_3$), aluminum(III) oxide ($Al_2O_3$), and the metal oxide dopant precursors used to form the aqueous solution may be selected from any chemical species containing the desired metals provided the sources are soluble in polar solvents. Exemplary metal sources include, metal nitrates, metal acetates, and/or metal halides. In one embodiment, gallium(III) oxide ($Ga_2O_3$), aluminum (III) oxide ($Al_2O_3$), and the metal oxide dopant precursors are metal nitrates. In another embodiment, gallium(III) oxide ($Ga_2O_3$), aluminum(III) oxide ($Al_2O_3$), and the metal oxide dopant precursors are metal alkoxides. Preferably, the metal precursors are dissolved separately and then combined to form the aqueous solution.

Polar solvents may be selected from but are not limited to deionized water; alcohols such as methanol, ethanol, isopropyl alcohol, n-butanol; acids such as acetic acid, and formic acid; nitromethane and/or any combination thereof.

The molar percentages (mol %) of gallium (Ga), aluminum (Al), and the metal oxide dopant metal within the aqueous solution may be 15%-45%, preferably 20%-40%, or more preferably 25%-35% Ga; 30-60%, preferably 35-55%, or more preferably 40%-50% Al; 1%-25%, preferably 3-23%, or more preferably 5%-20% metal oxide dopant metal relative to the total moles of metal salts. In one embodiment, the aqueous solution comprises 25-35 mol % Ga, 40-50 mol % Al, and 5-20 mol % Ni.

Forming the metal-doped aluminogallate suspension may be dependent upon a precipitating agent concentration of at least 1.0 mol/$cm^3$ to drive precipitation of the suspension. In one embodiment, the precipitating agent is an aqueous solution of ammonium carbonate having a concentration range of 3.0-5.0 mol/$cm^3$.

The metal-doped aluminogallate suspension is an undried product mixture with at least one solid phase and at least one liquid phase. The volumetric ratio of the solid phase to the liquid phase may include a range of 1:20 to 20:1, preferably 1:10 to 10:1, 1:9 to 9:1, 1:8 to 8:1, 1:7 to 7:1, 1:6 to 6:1, 1:5 to 5:1, 1:4 to 4:1, 1:3 to 3:1, 1:2 to 2:1 or about 1:1.

The suspension may include a plurality of metal salt species, including but not limited to $M(NO_3)_x$—$xH_2O$, $M(CH_3Co_2)_x$—$xH_2O$, $M_x(X)_y$, wherein M is selected from Ga, Al, and Ni X is a halide selected from Cl, I, and Br and x and y are non-zero integers. In one embodiment, the suspension comprises a plurality of $M(NO_3)_x$—$xH_2O$ species.

The present disclosure also relates to heating the metal-doped aluminogallate suspension to a hydrothermal reaction temperature in a range of 100° C.-350° C., for a residence time range of 24-100 hours to form a bulk metal-doped aluminogallate comprising $Ga_2O_3$, $Al_2O_3$ and the at least one metal oxide dopant comprising a metal selected from the group consisting of Cr, Mn, Fe, Co, Ni, Cu, Zn, Ag, Au, Pd, Pt, Ru, Rh, In, Ir, Tl, Ge, and Sn.

A hydrothermal reaction as used herein refers to any reaction where at least one reactant and/or reactant mixture comprising a plurality of metal salt species in the presence of water is placed in a hydrothermal reaction unit, at a reaction temperature and reaction pressure to undergo a hydrolysis and dehydration reaction resulting in a bulk metal oxide solid mixture (i.e. a bulk Ni-doped aluminogallate nanocomposite). Hydrothermal reactions, hydrolysis reactions, dehydration reactions, as well as a variety of hydrothermal reactors are well known by those skilled in the art.

An exemplary heating may include, transferring the metal-doped aluminogallate suspension to a sealable reaction vessel, placing the sealed reaction vessel in a hydrothermal reaction unit comprising at least one reaction zone, heating the sealed reaction vessel within the reaction zone to a hydrothermal reaction temperature between 100° C.-350° C., preferably 150° C.-250° C., more preferably 175° C.-225° C. over a residence time range of 24-100 hrs, preferably 36-72 hrs, or about 48 hrs to induce a hydrolysis reaction, a dehydration reaction, and/or both within the metal-doped aluminogallate suspension to yield the bulk metal-doped aluminogallate nanocomposite. In one embodiment, the hydrothermal reaction temperature range is 150° C.-250° C.

A residence time as used herein refers to a time period required to convert 75%-99%, preferably at least 90%, at least 91%, at least 92%, at least 93%, at least 94%, at least 95%, at least 96%, at least 97%, or at least 98%, by weight of the plurality of $M(NO_3)_x$—$xH_2O$ species in the metal-doped aluminogallate suspension into their respective metal oxides within the hydrothermal reactor's reaction zone.

In a preferred embodiment, the metal oxide dopant within the bulk metal-doped aluminogallate is nickel(II) oxide, NiO.

The bulk Ni-doped aluminogallate nanocomposite may comprise by mol %: 15%-45%, preferably 20%-40%, or more preferably 25%-35% gallium oxide ($Ga_2O_3$); 30%-60%, preferably 35-55%, or more preferably 40%-50% aluminum oxide ($Al_2O_3$); and 1%-25%, preferably 3%-23%, or more preferably 5%-20% nickel oxide (NiO); relative to the total bulk Ni-doped aluminogallate nanocomposite molar composition. In a preferred embodiment, the bulk Ni-doped aluminogallate nanocomposite comprises 25-35 mol % $Ga_2O_3$, 40-50 mol % $Al_2O_3$, and 5-20 mol % NiO.

The present disclosure also relates to mixing a carrier solvent with the bulk metal-doped aluminogallate nanocomposite to form a bulk metal-doped aluminogallate slurry.

In one embodiment, the bulk metal-doped aluminogallate slurry may comprise by mol %: 20%-45%, preferably 25%-40%, more preferably 30%-35% gallium oxide ($Ga_2O_3$), 35%-60%, preferably 40%-55%, more preferably 45%-50% aluminum oxide ($Al_2O_3$); and 2%-30%, preferably 3%-25%, more preferably, 5%-20% metal oxide dopant ($M_xO_y$); relative to the total bulk metal-doped aluminogallate nanocomposite molar composition.

The carrier solvent may be selected from but not limited to: deionized water; alcohols such as isoproproxyethanol, ethanol, butanol, isopropyl alcohol, diacetone alcohol; glycols such as, carbitols, diglycols, triglycols; glycol ethers; acetone, methylethylketone, ethoxy-, propoxy-, isopropoxy-, butoxyethanol-acetate esters, glycolesters, ethyl acetate, butyl acetate, butoxyethyl acetate, alkanes, toluene, xylene, acrylic acid, methacrylic acid, acrylate, methacrylate monomers, and/or any combination thereof.

The volume ratio of the bulk metal-doped aluminogallate nanocomposite to the carrier solvent within the bulk metal-doped aluminogallate slurry may include a range of 1:20 to 20:1, preferably 1:10 to 10:1, 1:9 to 9:1, 1:8 to 8:1, 1:7 to 7:1, 1:6 to 6:1, 1:5 to 5:1, 1:4 to 4:1, 1:3 to 3:1, 1:2 to 2:1 or 1:1.

Optionally, a binding agent, a dispersing agent, and/or both which are well known by those skilled in the art may be incorporated into the slurry. Respectively, the binding agent, and the dispersing agent are used to lower the slurry's viscosity while increasing dispersion of a solid phase (i.e. the bulk metal-doped aluminogallate nanocomposite) into a liquid phase.

Exemplary dispersing agents include glycolic acid, oxalic acid, malic acid, citric acids, pectins, amino acids, celluloses; polymers/oligomers such as polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate, polyvinyl alcohol, polyethylene glycol, polypropylene glycol, and/or any combination thereof.

Typical binding agents may include a vinyl resin such as polyvinyl alcohol, polyvinyl butyral, polyvinyl chloride, and/or any combination thereof; a cellulose resin such as methyl cellulose, ethyl cellulose, hydroxyethyl cellulose, and/or any combination thereof; and/or an acrylic resin, such as polyacrylate ester, polymethyl methacrylate, and/or any combination thereof. In one embodiment, the binding agent is polyvinyl butyral.

The present process also describes atomizing the bulk metal-doped aluminogallate slurry using a low temperature collision to produce a finely divided metal-doped aluminogallate nanocomposite.

Atomizing as used herein refers to any process where components distributed in a fluid phase traverses a high to low pressure gradient to produce smaller component units/droplets.

In one embodiment, the atomizing comprises injecting the bulk metal-doped aluminogallate slurry into a fluid carrier stream to produce a bulk metal-doped aluminogallate slurry stream.

Injecting as used herein refers to any process of rapidly introducing a substance into a continuously or periodically flowing fluid carrier stream to form a combined stream.

The fluid carrier stream may be a gas flow, a liquid flow and/or both from an external or internal source relative to the atomizing unit which are well known by those skilled in the art.

A typical atomizing unit may include at least one fluid carrier stream source fluidly connected to an injection inlet which is connected to an atomizing reaction zone, and at least one outlet. Exemplary fluid carrier streams may include but are not limited to, gases such as compressed air, inert gases such as helium, nitrogen, and argon; liquids such as deionized water; alcohols such as isoproproxyethanol, ethanol, butanol, isopropyl alcohol, diacetone alcohol; glycols such as, carbitols, diglycols, triglycols; glycol ethers; acetone, methylethylketone, ethoxy-, propoxy-, isopropoxy-, butoxyethanol-acetate esters, glycolesters, ethyl acetate, butyl acetate, butoxyethyl acetate, alkanes, toluene, xylene, acrylic acid, methacrylic acid, acrylate, methacrylate monomers, and/or any combination thereof. An atomizing unit incorporating a liquid carrier stream may be used for atomizing the bulk metal-doped aluminogallate slurry in order to minimize heat induced phase transitions and agglomeration of the metal oxide components. In one embodiment, the atomizing unit is a wet jet atomizer using a liquid carrier stream.

One advantage to the wet atomizing process disclosed herein is the ability of the liquid carrier stream, the carrier solvent, the binding agent, the dispersing agent, and/or any combination thereof to dissipate heat energy generated during atomizing. This directly contributes to the production of a finely divided and homogenous nanocomposite product.

The present process may include colliding the bulk metal-doped aluminogallate slurry stream with a surface of at least one collision agent within the atomizing unit reaction zone at a flow rate and a sufficient pressure to atomize the bulk metal-doped aluminogallate slurry stream components and form the finely divided metal-doped aluminogallate nanocomposite.

Colliding as used herein refers to any process where a component, material and/or a stream experiences a sudden de-acceleration or deformation that results in the production of comparatively smaller components, droplets, streams and/or any combination thereof.

The collision agent is any object that induces the colliding and may be of any shape, material composition or size provided it does not alter the chemical composition, or the phase of the bulk metal-doped aluminogallate slurry stream. In one embodiment, the at least one collision agent is a ceramic ball. The ceramic ball may be decentered relative to the slurry stream. A diameter of the ceramic ball may range from 5-30 mm, preferably 10-20 mm, more preferably 11-15 mm.

The collision agent provides a non-reactive surface for processing the metal oxide components of the bulk metal-doped aluminogallate slurry stream into the desired finely divided metal-doped aluminogallate nanocomposite. In an alternative embodiment, the collision agent is a portion of the bulk metal-doped aluminogallate slurry stream, wherein the portion of the bulk metal-doped aluminogallate slurry stream is flowed in an opposing or perpendicular direction to the metal doped aluminogallate slurry to induce the colliding.

The sufficient pressure experienced by the bulk metal-doped aluminogallate stream during the atomizing may be 50 MPa-400 MPa, preferably 75 MPa-250 MPa, more preferably 125 MPa-175 MPa.

The number of cycles ranges from 1-10, preferably 2-5, more preferably 2-4. In a preferred embodiment, the number of cycle ranges from 2-4 and the pressure ranges from 125 MPa-175 MPa.

Upon entering the atomizing reaction zone but prior to the colliding, the "pressurized" bulk metal-doped aluminogallate stream passes through a nozzle. The nozzle diameter may be 50 μm-300 μm, preferably 75 μm-250 μm, more preferably 100 μm-200 μm and yields a bulk metal-doped aluminogallate stream with a flow rate of 2-840 L/hr, preferably 10-700 L/hr, preferably 30-650 L/hr, preferably 50-500 L/hr, preferably 70-350 L/hr, preferably 90-200 L/hr, preferably 100-150 L/hr.

According to a second aspect, the present disclosure relates to a finely divided nickel-doped aluminogallate nanocomposite (e.g. GAN), comprising $Ga_2O_3$, $Al_2O_3$, and NiO, wherein the nanocomposite is in the form of a nanoparticle comprising a diameter of 100-200 nm, a surface area range of 250-300 $m^2/g$, and an uncontaminated spinel structure.

A nanocomposite as used herein, refers to a multicomponent solid material where at least one component include units with one, two or three dimensions of less than 200 nanometers, preferably less than 100 nm and/or possesses repeating distances between different phases of the material on the nano-scale. In the broadest sense, this definition can include porous media, colloids, gels and copolymers, but is usually taken to mean the solid combination of a bulk matrix and a nano-dimensional phase differing in properties due to dissimilarities in structure and chemistry. Generally, the nanocomposite's mechanical, electrical, thermal, optical, electrochemical, catalytic properties and/or any combination thereof will differ from that of the component materials.

As a result of the atomizing step, the finely divided nickel-doped aluminogallate nanocomposite may be in the form of nanoparticles possessing diameters ranging from 50-250 nm, preferably 80-230 nm, more preferably 100-200 nm, more preferably 120-180 nm, more preferably 140-160 nm.

In one embodiment, the present disclosure relates to a finely divided nickel-doped nanocomposite in the form of nanoparticles wherein a nanoparticle's diameter ranges from 100-200 nm.

Since atomizing may eliminate the need for high temperature processing steps such as calcinating, milling and/or both, nanocomposite materials with a uniform crystal structure such as spinel structures may be produced. In one embodiment, the bulk Ni-doped aluminogallate nanocomposite, the bulk Ni-doped aluminogallate slurry, the metal-doped aluminogallate suspension and/or any combination thereof are not subjected to calcinating, milling, or both.

Phase transitions as used herein refer to changes in a crystal structure's repeating unit as a result of exposure to or an absence of an amount of an external force such as pressure and/or an energy source such as heat.

A repeating unit as used herein refers to the smallest repeating structural arrangement of connected atoms, within, a nano, molecular, and/or bulk material's structure.

The uncontaminated spinel structure refers to a crystal structure comprising $AB_2O_4$ repeating units, wherein A is a divalent metal cation (such as a metal dopant), B is a trivalent metal cation (such as Al, Ga, Fe, Cr, Mg, Ti, Si and/or any combination thereof) and O is a divalent anion (such as $O^{-2}$, $S^{-2}$, $Se^{-2}$, $Te^{-2}$ and or any combination thereof). In the uncontaminated spinel structure (e.g. normal spinel structure) the respective metal cations reside in tetrahedral and octahedral sites of the crystal structure to produce a material with a large surface area. In one embodiment, the present disclosure provides a process for producing a $Ga_2O_3$—$Al_2O_3$—NiO (GAN) nanocomposite, wherein the $Ga_2O_3$—$Al_2O_3$—NiO nanoparticles are in a uncontaminated spinel crystal structure.

The $AB_2O_4$ repeating units may comprise greater than 75%, preferably greater than 80%, preferably greater than 85%, preferably greater than 90%, preferably greater than 95% by weight of the uncontaminated spinel crystal structure. In one embodiment, the $AB_2O_4$ repeating unit comprises greater than 95% of the $Ga_2O_3$—$Al_2O_3$—NiO (GAN) nanocomposite's uncontaminated spinel structure by weight.

The $AB_2O_4$ repeating unit may also be found within materials comprising inverted spinel, olivine, rutile, perovskite, sphalerite, or wurtzite crystal structures or any combination thereof.

The "spinel structured" nickel-doped aluminogallate nanocomposite may include a surface area of 100-500 $m^2/g$, preferably 150-400 $m^2/g$, more preferably 250-300 $m^2/g$, more preferably 275-295 $m^2/g$, more preferably 280-290 $m^2/g$.

In one embodiment, the present disclosure describes the GAN nanocomposite with a spinel structure, wherein the $Ga_2O_3$—$Al_2O_3$—NiO nanoparticles have a surface area of 289 $m^2/g$.

The large surface area of the spinel structured metal-doped aluminogallate nanocomposite provides a catalytic advantage by increasing the number available reactive sites for chemical reactions such as NO decomposition.

A spinel structured nanocomposite using a metal oxide dopant comprising a comparatively smaller metal ion than Al and Ga may further enhance the increased nanocomposite surface area by occupying voids/spaces in the spinel structure. Metal dopants with smaller metal ions maybe selected from but not limited to Cr, Mn, Fe, Co, Ni, Cu, Zn, Ag, Au, Pd, Pt, Ru, Rh, In, Tr, Tl, Ge, Sn, and/or any combination thereof. In one embodiment, the present disclosure provides a process for producing a spinel structured GAN, wherein at least one NiO is present on an outer surface of the $Ga_2O_3$—$Al_2O_3$—NiO nanoparticles.

In a preferred embodiment, the present disclosure provides a process for producing a GAN catalyst comprising by mol %: 25-35 mol % $Ga_2O_3$, 40-50 mol % $Al_2O_3$, and 5-30 mol % NiO.

According to a third aspect, the present disclosure relates to a method of direct nitric oxide (NO) decomposition which includes contacting an initial gas mixture comprising nitric oxide with the finely divided nickel-doped aluminogallate nanocomposite (e.g. GAN catalyst) at an activating temperature to decompose NO into $N_2$.

Figure 6:
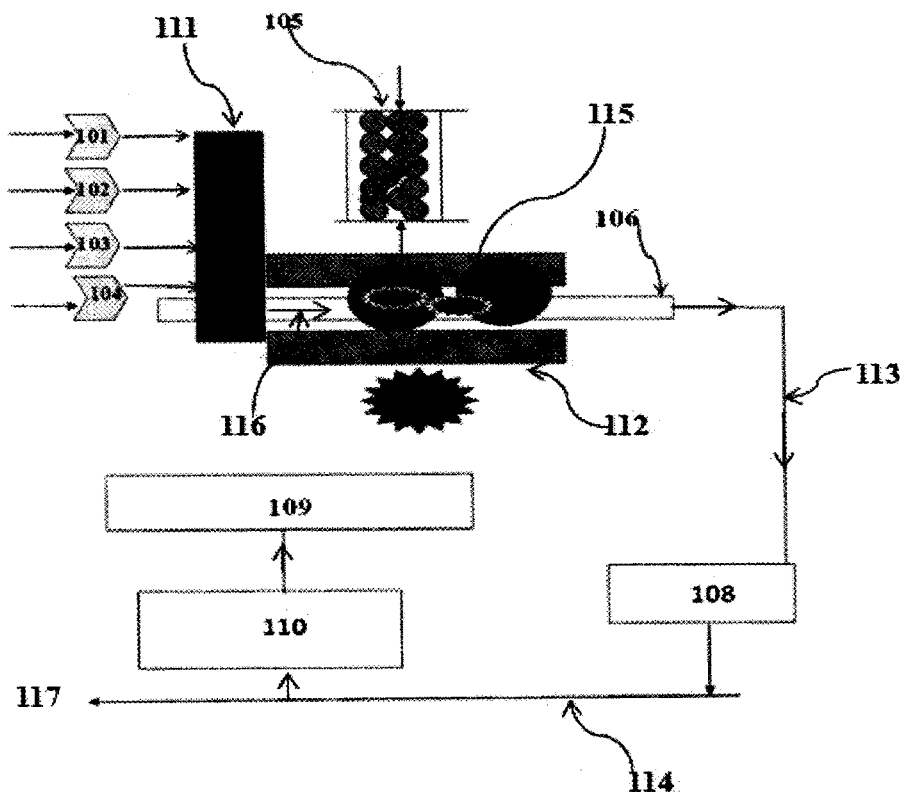
FIG. 6 is a schematic diagram of the catalyst performance testing procedure.
Figure 7:
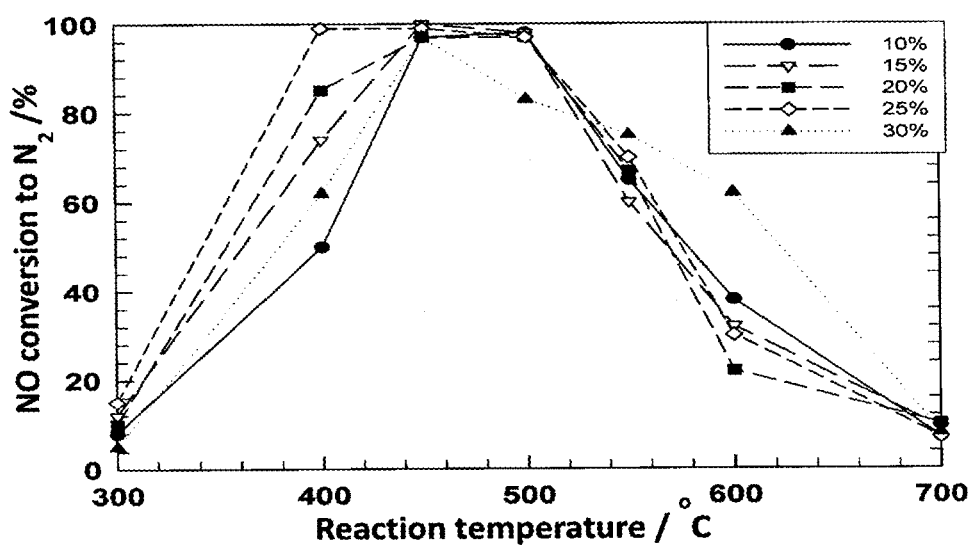
FIG. 7 illustrates the catalytic activities of GAN catalyst powders with various NiO contents under NO reduction as a function of reaction temperature.
Figure 8:
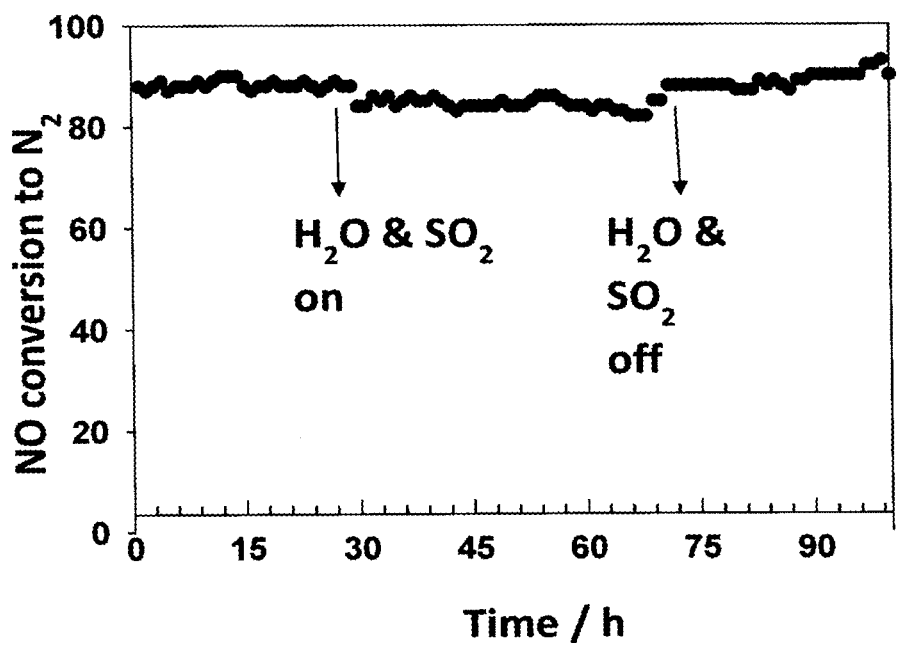
FIG. 8 illustrates the durability of a GAN catalyst powder in the presence of $H_2O$ vapor and $SO_2$.
Figure 9:
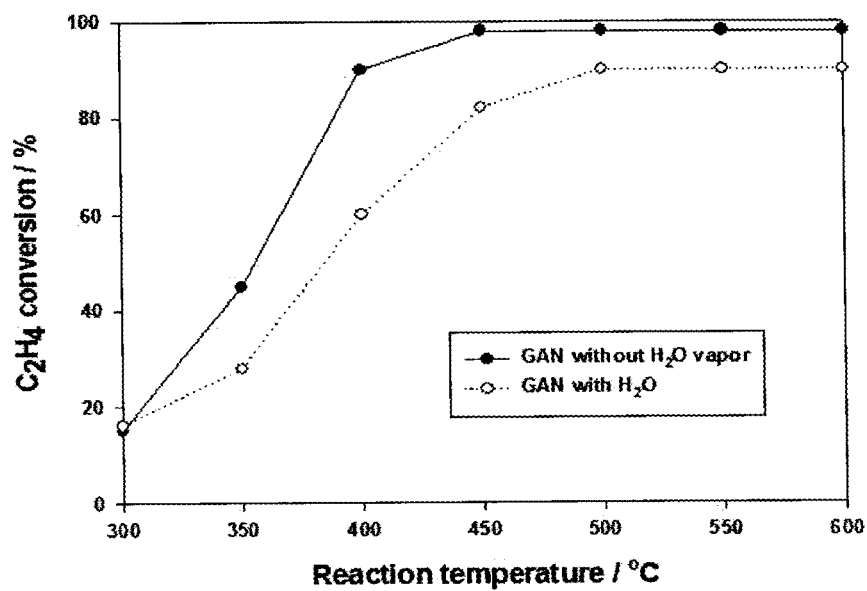
FIG. 9 illustrates the conversion of $C_2H_4$ to $CO_2$ over GAN catalysts under dry (without $H_2O$) and wet (with $H_2O$) conditions as a function of reaction temperature.

Referring now to FIG. 6 where a method of direct NO decomposition is illustrated. In one embodiment, an initial gas mixture (116) is formed by feeding oxygen (101), a reducing agent (e.g. ethylene) (102), NO (103), and helium (104) into a mass flow controller (111), the initial gas mixture (116) passes into a micro-reactor (112) and contacts a fixed bed of catalyst (106) comprising a finely divided metal-doped aluminogallate nanocomposite supported on a catalyst support (e.g. glass wool) within the micro-reactor reaction zone (105) at a reaction temperature via a heat source (107) to become an exit gas mixture (113). The exit gas mixture passes to a dehumidifying unit (108) to yield a dehumidified exit gas mixture (114), and at least a portion of the dehumidified exit gas mixture is separated in a gas chromatograph (110) comprising a NO meter (109), while the rest of the dehumidified exit gas mixture (114) is vented (117).

The micro-reactor array as described in FIG. 6 may be used to carry out the method disclosed herein, The micro-reactor array may include at least one mass flow controller (111) comprising at least two inlet ports, preferably at least three inlet ports, more preferably at least four inlet ports, at least one outlet port, and at least two, preferably three, more preferably four separate internal zones each outfitted with a mass flow sensor; a fluidly connected micro reactor (112) comprising a temperature controller, a heating source (107) and a reaction zone with an internal diameter of 2-20 mm, preferably 5-10 mm, more preferably 6-8 mm fluidly connected to a dehumidifying unit (108), which is fluidly connected to a separating unit (110) such as a gas chromatograph comprising molecular sieves, and a NO meter (109). Mass flow controllers, micro reactors, dehumidifying units, NO meters, and gas chromatographs are all known by those skilled in the art.

The initial gas mixture composition may include by mol % 100-10000 ppm, preferably 500-5000 ppm, more preferably 750-1250 ppm NO; 1-50%, preferably 2-40%, more preferably 5-10% $O_2$ relative to the total molar composition of the initial gas mixture.

In one embodiment, the initial gas mixture (116) may further comprise a reducing agent selected from the group consisting of ethylene ($C_2H_4$), propylene ($C_3H_6$), butene ($C_4H_8$), ammonia ($NH_4$) and/or any combination thereof. In another embodiment the initial gas mixture (116) may include 100-20000 ppm, preferably 500-10000 ppm, more preferably 750-5000 ppm, more preferably 1000-2000 ppm reducing agent.

As disclosed herein, a reducing agent may be added to a catalytically driven direct NO decomposition reaction. As a result, the reducing agent is also decomposed to produce a decomposition product (e.g. $CO_2$), alongside $N_2$.

Suitable reducing agents for NO decomposition are well known by those skilled in the art. Exemplary reducing agents include but are not limited to ethylene ($C_2H_4$), propylene ($C_3H_6$), butene ($C_4H_8$), ammonia ($NH_4$) and/or any combination thereof. In one embodiment, the gas mixture comprises by mol %: 1000 ppm NO, 2000 ppm $C_2H_4$, and 10% $O_2$.

An exemplary operation may include feeding oxygen (101), ethylene (102), NO (103), and helium (104) into a mass flow controller to form an initial gas mixture (116), flowing the initial gas mixture (116) at a constant flow rate to the micro reactor reaction zone at an activating temperature range and a ramping rate of 1-30 $Kmin^{-1}$, preferably 5-15 $Kmin^-$, more preferably 8-12 $Kmin^{-1}$, contacting the initial gas mixture (116) with a fixed bed of GAN catalyst (106) supported on glass wool to decompose NO and optionally the reducing agent forming an exit gas mixture (113) comprising $N_2$ and a decomposition product, removing water from the exit gas mixture (113) in the dehumidifying unit (108), separating the dehumidified exit gas mixture (114) using a gas chromatograph (110) into chemical components including but not limited to NO, $CO_2$, $C_2H_4$, $N_2$, and/or any combination thereof, and measuring the molar concentration of the chemical components therein.

Alternatively, the components of the initial gas mixture (116) may be combined at any point prior to entering the micro-reactor reaction zone. When combined with the multi-port/channel mass flow controller, the initial gas mixture (116) composition may be altered without discontinuing the method. This allows the method disclosed herein to continuously function on a variety of gas mixture compositions.

The activating temperature as used herein refers to an initial temperature at which chemical conversion in the presence of a catalyst begins. The activating temperature for the GAN catalyst may be 300-700° C., preferably 325-650° C., more preferably 350-570° C.

The method disclosed herein may use alternative supports for the catalyst including, cordierite, titanium dioxide, aluminum oxide, silicon dioxide, iron oxide, alumina, silica, iron chromium aluminates, and/or any combination thereof.

It can also be envisioned where the GAN catalyst bed is fluidized using an inert gas stream to increase contact between the gas mixture and the GAN catalyst.

Fluidized as used herein refers to a dynamic state of matter where a material and/or nanocomposite is dispersed within a fluid such as a gas or liquid.

The exit gas mixture (113) refers to an output stream from the micro-reactor unit (112) containing a comparatively higher mol % of $N_2$, decomposition product and/or both relative to the initial gas mixture. The exit gas mixture (113) may include 100-10000 ppm, preferably 500-5000 ppm, or more preferably 750-1250 ppm $N_2$; 100-20000 ppm, preferably 500-10000 ppm, more preferably 750-5000 ppm, or more preferably 1000-2000 ppm decomposition products such as CO and $CO_2$.

The dehumidified exit gas mixture (114) as used herein refers to an exit gas stream from the dehumidifying unit (108) which comprises a comparatively lower $H_2O$ content than the exit gas mixture (113). In one embodiment the dehumidified exit gas mixture (114) comprises less than 10 ppm water, preferably less than 5 ppm, more preferably less than 1 ppm $H_2O$. The GAN catalyst's large surface area and more uniform nanoparticle diameter distribution provide an abundant and consistent reactive surface for the initial gas mixture (116) during the contacting. As a result, a high conversion maximum for NO decomposition is also observed.

A maximum conversion as used herein refers to the highest efficiency value for a chemical reaction (such as NO decomposition). The value is often represented as a percentage calculated from the final concentration of nitrogen within the exiting gas mixture vs an initial concentration of nitric oxide in the initial gas mixture (116). Similarly, the maximum conversion of $C_2H_4$ to $CO_2$ (which is an example of the decomposition of the reducing agent into a decomposition product) may be calculated as a ratio of the final concentration of $CO_2$ within the exiting gas mixture vs the initial concentration of $C_2H_4$ within the initial gas mixture (116). These values may also be used comparatively to represent the highest performance level of a catalyst present during the given chemical reaction. The concentration values of the gases are expressed in parts-per-million, ppm.

A maximum conversion temperature range as used herein refers to a temperature range during which the conversion maximum occurs. The maximum conversion temperature range for NO decomposition in the presence of the GAN catalyst may be 300-700° C., preferably 360-600° C., or more preferably 370-560° C. In one embodiment, the maximum conversion temperature range for NO decomposition in the presence of the GAN catalyst is 370-560° C.

The robust nature and performance of the GAN catalyst under "poisoning" conditions is another feature of the method disclosed herein.

"Poisoning" conditions as used herein refer to the presence of water, sulfates or both within the gas mixture.

The initial gas mixture (116) under poisoning conditions may include by volume, 100-10000 ppm, preferably 500-5000 ppm, more preferably 750-1250 ppm NO; 100-20000 ppm, preferably 500-10000 ppm, more preferably 750-5000 ppm, more preferably 1000-2000 ppm of reducing agent; 1-50%, preferably 2-40%, more preferably 5-10% $O_2$; 1-30%, preferably 2-20%, more preferably, 3-10% $H_2O$ vapor; 1-10 ppm, preferably 2-8 ppm, more preferably 3-5 ppm of $SO_2$ gas; diluted in He, relative to the total volume of the initial gas mixture.

Even under poisoning conditions, the GAN catalyst is not deactivated. In one embodiment, the maximum conversion of NO—$N_2$ by volume may be reduced by no more than 25%, preferably no more than 20%, more preferably no more than 17% when the gas mixture further comprises up to 10 vol % $H_2O$ vapor, up to 3 ppm of $SO_2$ gas, and/or both relative to the total volume of the gas mixture within the maximum conversion temperature range.

The method disclosed herein also takes advantage of the GAN catalyst's durability.

As used herein, durability refers to the capacity of a material to sustain a level of performance for a prolonged period of time. In one embodiment, NO to $N_2$ conversion in the presence of the GAN catalyst, and under poisoning conditions proceeds continuously for up to 50 hrs at 80%-90%, preferably at least 81%, preferably at least 82%, more preferably at least 83%, more preferably at least 84%, more preferably at least 85%, more preferably at least 86%, more preferably at least 87%, more preferably at least 88%, or more preferably at least 89% conversion relative to the initial molar concentration of NO in the initial gas mixture (116).

The examples below are intended to further illustrate protocols for preparing and characterizing the finely divided metal-doped nanocomposites which include a plurality of metal oxide nanoparticle units and uses thereof. Further they are intended to illustrate assessing these catalytic materials for nitric oxide decomposition in the presence of water, sulfates and prolonged catalyst activity described herein, and are not intended to limit the scope of the claims.

EXAMPLE 1

Hydrothermal Method

The appropriate amounts of the starting metal nitrates were dissolved separately in distilled water. An appropriate amount of $(NH_4)_2CO_3$ solution (4.1 mol cm$^{-3}$) was added to the solution of the nitrates to co-precipitate metallic ions. The pH of the solution was kept at approx. 8.5 and then the solution was vigorously stirred for 24 h. The precursor slurry was transferred into a plastic container with an inner volume of 30-50 cm$^3$ held in a steel vessel. $N_2$ gas was flushed through the slurry for 10 min. The mouth of the vessel was closed, and the hydrothermal reaction was performed at 200° C. for 48 h. An autoclave with a capacity of 1000 mL and a magnetically driven stirrer was used for this hydrothermal reaction. The obtained powders were washed with alcohol and deionized water three times and dried at 110° C.

EXAMPLE 2

Co-Precipitation Method

An aqueous solution was prepared by dissolving transition metal nitrate salts. The precipitation of the metallic ions was induced by the addition of ammonium carbonate salt. The solution pH was kept at approximately 8.5 and the solution was agitated for 24 h. The obtained products were washed with distilled water four times. The powder sample was dried at 120° C. and calcined at 850° C. for 2 h in air.

EXAMPLE 3

Sol-Gel Method

An aluminum boehmite solution was prepared by hydrolyzing aluminum(III) tri-isopropoxide in hot water (90° C.) under inert conditions, to obtain a clear solution, a small amount of nitric acid was added and then the appropriate amounts of gallium(III) nitrate and metal nitrates were mixed. The "sol" solution was stirred for 12 h. Solvents were removed by heating at 60° C. for 24 h and the residues were dried and calcined at 600° C. for 5 h in air.

EXAMPLE 4

Wet-Atomization

The "Star Burst System" HJP-25001 (Sugino Machine Ltd.) was used for the atomization of the hydrothermally synthesized GAN slurry and/or solution. A very short processing period, particle size reduction, and homogenization can be achieved by using this system. The system generates a high pressure in the range 100~200 MPa, which produces fine particles and homogeneous dispersions. In high-pressure atomization, the liquid is passed through a narrow nozzle at a high flow rate. As a result, very fine powders with large surface areas were obtained. Heat is generated from the kinetic energy of the liquid flowing at high speed during the atomizing, which promotes deterioration of the dispersion liquid component and agglomeration of the particles. The fluid flow pressure and number of cycles of atomization were optimized for the highly dispersed GAN slurry. A plastic container was used to collect the slurry. GAN powders were also synthesized with the sol-gel method for comparison.

The properties of the GAN nanocomposites prepared in Examples 1-4 are summarized in Table 1.

TABLE 1

BET surface area, pore volume, and average pore diameter of the GAN nanocomposites (calcined at 800° C. for 1 h in air).

|  | Surface area ($m^2g^{-1}$) | Pore volume ($cm^3g^{-1}$) | Mean pore diameter$^a$ (nm) |
|---|---|---|---|
| Co-precipitation | 82 | 0.22 | 6.0 |
| Sol-gel | 200 | 0.62 | 17.4 |
| Hydrothermal | 220 | 0.60 | 16.0 |
| Hydrothermal and wet atomization | 292 | 1.06 | 19.9 |

$^a$BJH method from the adsorption isotherm

EXAMPLE 5

Catalytic Activity Measurements

A Pyrex glass tubular reactor with an internal diameter of 12 mm was used in the catalytic performance tests. The samples were retained between glass wool plugs in the reactor. A mass flow controller was used to control the gas flow rate. A 4-channel electronic mass-flow controller was used to fix the total flow rate at a constant value. The furnace temperature was increased at a linear heating rate of approx. 10 Kmin$^{-1}$ with a computer-based temperature controller. Before the performance tests, the total system was activated by increasing the temperature from 200° C. to 700° C. under real feed conditions. Data was collected during cooling from 700° C. to 200° C. every 60° C. after 40 min stabilization at each selected temperature point. During the $H_2O$ vapor and $SO_2$ poisoning tests, 10% $H_2O$ vapor and 3 ppm $SO_2$ were inserted into the gas mixture with a micro-pump. The catalytic activities were determined in a flowing gas containing 1000-2000 ppm NO, 10% $O_2$, 3-10 ppm $SO_2$, and 2-10% $H_2O$ diluted in He. Gas chromatography and a molecular sieve were used to analyze the effluent gas at intervals of 20 min. By using an empty catalyst test station, an experiment was performed by flowing the original feed to verify that no $NO_x$ reduction occurs in the absence of catalyst.

NO and hydrocarbon conversion were calculated based on the hydrocarbon intake to obtain the NO reduction percentage. The NO conversion and the hydrocarbon conversion to $CO_x$ ($CO+CO_2$) were calculated based on the following expressions. The percentage error in the calculation data should be less than 2%.

$$\text{NO conversion to } N_2(\%) = \{2[N_2]/[NO]^{in}\} \times 100$$

$$C_2H_4 \text{ conversion to } CO_2(\%) = \{(\tfrac{1}{2})[CO_2]/[C_2H_4]^{in}\} \times 100$$

The 3$^{rd}$ bracket denotes the feed concentration, and $[NO]^{in}$ and $[C_2H_4]^{in}$ are the initial concentrations of NO and $C_2H_4$ respectively. $[N_2]$ and $[CO_2]$ are the final (after testing) concentrations of $N_2$ and $CO_2$.

The invention claimed is:

1. A process for producing a finely divided NiO-doped aluminogallate nanocomposite having a spinel structure comprising:

mixing a carrier solvent with a bulk metal-doped aluminogallate nanocomposite synthesized by a process selected from the group consisting of co-precipitation, sol-gel, and hydrothermal to form a bulk metal-doped aluminogallate slurry, wherein the bulk metal-doped aluminogallate nanocomposite comprises:
$Ga_2O_3$;
$Al_2O_3$; and
nickel oxide dopant; and
atomizing the bulk metal-doped aluminogallate slurry using a collision to produce the finely divided NiO-doped aluminogallate nanocomposite;
wherein the carrier solvent is at least one selected from the group consisting of deionized water, ethanol, butanol, isopropyl alcohol, diacetone alcohol, diglycol, triglycol, acetone, methyl ethyl ketone, ethyl acetate, butyl acetate, toluene, and xylene.

2. The process of claim 1, wherein the bulk divided NiO-doped aluminogallate is synthesized by a hydrothermal process comprising:
adding a precipitating agent to an aqueous solution comprising a gallium salt, an aluminum salt, and a nickel dopant salt to form a nickel-doped aluminogallate suspension with a pH of 8-12; and
heating the nickel-doped aluminogallate suspension to a hydrothermal reaction temperature in a range of 100° C.-350° C., for a reaction time range of 24-100 hrs to form the bulk metal-doped aluminogallate nanocomposite.

3. The process of claim 2, wherein the bulk metal-doped aluminogallate slurry, the finely divided NiO-doped aluminogallate nanocomposite or both are not calcined or milled.

4. The process of claim 1, wherein the atomizing comprises:
injecting the bulk metal-doped aluminogallate slurry into a fluid carrier stream to produce a bulk metal-doped aluminogallate slurry stream;
colliding the bulk metal-doped aluminogallate slurry stream with a surface of at least one collision agent within an atomizing unit reaction zone at a flow rate and a sufficient pressure to atomize the bulk metal-doped aluminogallate slurry stream and form the finely divided NiO-doped aluminogallate nanocomposite without any heat induced phase transitions.

5. The process of claim 4, wherein the atomizing unit is a wet jet atomizer.

6. The process of claim 4, wherein the sufficient pressure is 50 MPa-400 MPa.

7. The process of claim 4, wherein prior to the colliding the bulk metal-doped aluminogallate slurry stream passes through a nozzle having a nozzle diameter of 50 μm-300 μm.

8. The process of claim 4, wherein the flow rate of the bulk metal-doped aluminogallate slurry is 2 L/hr to 840 L/hr.

9. The process of claim 4, wherein the at least one collision agent is at least a portion of the bulk metal-doped aluminogallate slurry.

10. The process of claim 4, wherein the at least one collision agent is a ceramic ball.

11. The process of claim 1, wherein the bulk metal-doped aluminogallate slurry comprises:
20-45 mol % $Ga_2O_3$;
35-60 mol % $Al_2O_3$; and
2-30 mol % nickel oxide dopant relative to the total molar composition of the bulk metal-doped aluminogallate nanocomposite.

12. The process of claim 1, wherein the finely divided NiO-doped aluminogallate nanocomposite having a spinel structure further has a diameter of 100-200 nm and a surface area range of 250-300 $m^2/g$.

* * * * *